3,441,621
PROCESS FOR THE PREPARATION OF ALKALI
METAL ACETYLIDES
Robert J. Tedeschi, Whitehouse Station, and George L. Moore, South Plainfield, N.J., assignors to Air Reduction Company, Incorporated, New York, N.Y., a corporation of New York
No Drawing. Filed Dec. 30, 1966, Ser. No. 613,376
Int. Cl. C07f 3/04
U.S. Cl. 260—665      8 Claims

ABSTRACT OF THE DISCLOSURE

A process for producing alkali metal acetylides by the interaction of alkali metals with liquified acetylene.

This invention relates to the synthesis of organic compounds and particularly to the preparation of alkali metal acetylides by the interaction of alkali metals with liquified acetylene as the reactant and solvent.

Alkali metal acetylides have been prepared by reacting acetylenic hydrocarbons with the alkali metal dissolved in excess liquid ammonia or by directly contacting sodium with acetylene gas or by the use of organic solvents. Acetylides made without the use of excess liquid ammonia are slow to react with other reagents. It has also been proposed to first prepare a solution of an alkali metal addition compound of a polycyclic aromatic hydrocarbon such as naphthalene, diphenyl, anthracene, acenaphthene, retene and the like and then react this addition compound solution with the acetylenic hydrocarbon. This procedure, however, required the use of certain classes of expensive solvents to promote the reaction of alkali metals with aromatic hydrocarbons to form these intermediate addition compound solutions.

It is the object of this invention to provide an improved process for reacting acetylene with alkali metals to form the corresponding acetylides. More specifically it is the object of this invention to prepare alkali metal acetylides by reacting the alkali metals with liquefied acetylene as the reactant and solvent. These and other objects will be apparent from the detailed description which follows.

It has been found that potassium, sodium and lithium react rapidly and in high conversion in excess liquid acetylene employing a catalytic amount of either ammonia or simple alkyl amines to yield active alkali metal acetylides. The reaction is conducted at temperatures in the range of from about −30° to about 35° C. (i.e. below the critical temperature of acetylene, 36° C.), preferably 10° to 30° C. and at pressures which are suitably in the range of from about 100 to about 800 p.s.i.g. It has also been found that sodium and only liquid acetylene also yielded sodium acetylide but at a slower rate.

The surprising activation observed with catalytic amounts of ammonia is best explained by the following mechanism, which involves both an ionic and free radical route, accompanied by disproportionation.

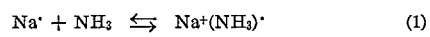

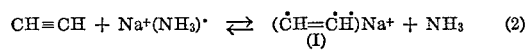

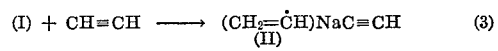

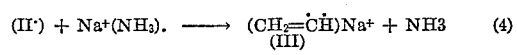

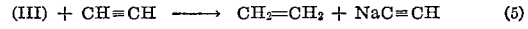

Overall route (first stage):
First stage:
$$3CH{\equiv}CH + 2Na \longrightarrow 2NaC{\equiv}CH + CH_2{=}CH_2$$

Second stage:

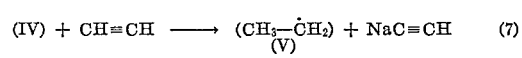

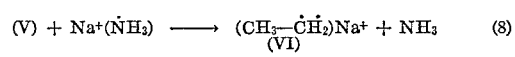

Overall route (second stage):
$$2Na + CH_2{=}CH_2 + 2CH{\equiv}CH \longrightarrow 2NaC{\equiv}CH + CH_3{-}CH_3$$

Total stoichiometry for both stages:
$$5CH{\equiv}CH + 4Na \longrightarrow 4NaC{\equiv}CH + CH_3{-}CH_3$$

The further attack of $Na^+(\dot{N}H_3)$ on ethylene via the second stage mechanism (6–9) is a minor route compared to the first stage. The amount of ethane experimentally observed (vapour fractometry) averages only one-eighth the amount of ethylene produced.

However, the fact that in the absence of ammonia ethylene and ethane are still obtained indicates that electron transfer is still possible via the direct reaction of sodium with liquid acetylene to yield ion-radical (I). The rate of this reaction however, is slower than that observed with the sodium-ammonia species ($Na^+NH_3\cdot$), but steps 2 to 5 are still valid.

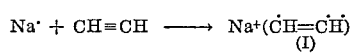

The alkali metals, preferably sodium, may be used as dispersions in mineral oils or as sand or granules or small cubes. The ratio of acetylene to alkali metals can be as low as 1.25 mole and is preferably about 3 to 6 moles per gram atom of alkali metal. Large excesses provide no advantage. The reaction generally ranges from about one to six hours or more, particularly if a catalyst is not used.

The preferred catalyst is ammonia although simple mono alkyl amines or diamines such as the primary, secondary and tertiary amines of methane, ethane or propane may also be used. The loading of the catalyst may range from about 0.05 mole to 10 moles per gram atom of the alkali metal. A preferred range is 0.25 to 5 moles per gram atom of alkali metal.

If desired, dry, inert diluents such as dioxane, tetrahydrofuran, methylal, $C_1$–$C_8$ aliphatic, alicyclic, and aromatic hydrocarbons may be used. However, these diluents do not appear to offer any advantage and may interfere with the recovery of the product and/or reactant.

The process in accordance with the present invention provides a rapid, efficient process for the direct conversion of alkali metals and liquefied acetylene into alkali metal acetylides of high purity and in high yields. Moreover, the process could be readily operated in a continuous manner.

The following examples are illustrative of the present invention.

EXAMPLE I

Into a 150 cc. stirred autoclave previously dried at 40–45° C., under nitrogen, there is introduced 6 cc. of a sodium dispersion in Nujol (40% Na), 0.10 mole sodium. The autoclave is then sealed, pressure tested to make certain there are no leaks and then cooled by means of circulating methanol heat exchange fluid. Once the reactor temperature as indicated on the internal thermocouple is below −30° C. the liquefaction of acetylene into the reactor can be started. This acetylene buret is compressed to 400 p.s.i.g., then at an autoclave temperature range of −30 to −50° C. the entire acetylene charge can be readily introduced and liquefied. On liquefaction of the acetylene (0.60 mole) a noticeable exotherm of 10–15° C. is common and should cause no concern. At a reaction temperature of −50° C. the observed pressure is approximately 150 p.s.i.g., and at 0° C. it is 280 p.s.i.g. The liquid acetylene can easily be liquefied into the reactor rapidly, generally in several minutes. The reaction mixture is then gradually warmed to approximately 5–10° C. in about 5 minutes.

Next, by means of the external buret and the internal calibrated buret 0.05 mole of liquid ammonia (1.9 cc.) is gradually added to the stirred slurry of sodium dispersion and liquid acetylene. With the small catalytic amount of ammonia used in this experiment no exotherm is generally observed on addition of the entire ammonia charge rapidly. However, once the temperature is raised to 15–20° C. a gradual and sustained exothermic effect is noted and the reaction temperature may reach 8 to 10° higher than the non-circulating internal cooling fluid. The reaction exotherm is allowed to carry the temperature into the 25–30° range and at this point cooling fluid is cautiously circulated for a very short time (only seconds) to make sure that the temperature does not climb above the critical temperature (36° C.) of acetylene. The high degree of response of the autoclave to the cold (−60° C.) cooling fluid or the hot bath makes its system versatile both for cooling and heating.

Approximately 30 min. after the ammonia has been added and the temperature held in the 25–30° C. range, the reaction is no longer exothermic. It is then stirred at the prescribed temperature for a total of two hours. At the end of this time approximately 30 cc. of dry hexane is added to the external liquid buret which has been previously vented of any liquid ammonia. The hexane is then introduced slowly in the usual manner from the external buret, to the internal buret and then to the autoclave. As the hexane is slowly added the reaction vent valve is slowly opened and the liquid acetylene gradually allowed to vaporize from the reaction mixture. The autoclave is gradually vented to zero gauge pressure and then purged with several portions of nitrogen to eliminate excess acetylene. The temperature at which venting is carried out is generally 15–20° C., although cooling by gas evaporation sometimes lowers the temperature to about 0° C.

To facilitate isolation of the sodium acetylide under essentially anhydrous conditions a glass siphon or blow-leg equipped with a stopper which fits snugly into the mouth of the autoclave and a longer leg which is fitted by a rubber stopper to a side arm of a suction flask used to transfer the sodium acetylide slurry from the autoclave. Nitrogen pressure from the nitrogen system is slowly applied to the flask. The autoclave is rinsed a number of times and stirred with the blow-leg and the charge transferred to the flask until an essentially quantitative transfer has been made.

The sodium acetylide-hexane slurry is then transferred to a dry 250 cc. centrifuge bottle in the dry box at 0% relative humidity. Several small rinses of hexane are used to effect a quantitative transfer. The centrifuge bottle and its rubber stopper are previously tared. The resulting sodium acetylide slurry is then removed from the autoclave, the stopper bottle balanced with an equal tared bottle, and then centrifuged for a total of 5 minutes. The hexane layer is quickly decanted, a fresh charge of hexane added, the stopper quickly replaced, and the slurry mixed until uniform once again. The above operation need not be carried out in a dry box if it is done rapidly since the hexane coating the sodium acetylide minimizes any absorption of atmospheric moisture. After centrifuging a second time the operation is repeated once more to be sure the residual Nujol derived from the sodium dispersion used is completely removed. The sodium acetylide, well drained from the hexane, is then placed in a vacuum desiccator and dried at room temperature and 1 mm. pressure to constant weight during 3 to 4 hours. The sodium acetylide dried to constant weight is a fine white powder and weighs 4.9 grams (theory 4.8 g.), indicating 102% conversion. Analyses of the sodium acetylide indicated 97.0% purity based on sodium and 92.0% based on acetylene.

EXAMPLE II

The procedure of Example I was followed using the same amounts of sodium and acetylene with 0.10 mole rather than 0.05 mole ammonia. The temperature was 5–21° C., pressure 400–478 p.s.i.g. and the reaction time was 2½ hours. The yield of sodium acetylide was the same as in Example I (4.9 grams) and the purity based on sodium was 96.2% and 86% based on acetylide.

EXAMPLE III

The procedure of Example I was followed using the same amounts of sodium and acetylene with 0.41 mole rather than 0.05 mole ammonia. The temperature was 8–25° C., pressure 360–400 p.s.i.g. and the reaction time was 1¼ hours. The yield was 4.8 grams (100% of theory) and the purity based on sodium was 95.8% and 86% based on acetylide.

EXAMPLE IV

The procedure of Example I was followed using 0.2 mole sodium, 0.90 mole acetylene and 0.05 mole ammonia. The temperature 11–26° C., pressure 540–692 p.s.i.g. and the reaction time was 3 hours. The yield was 9.4 grams (98% of theory). The product was not analyzed for sodium acetylide. However, vapor fractometry analyses for acetylene, ethylene and ethane showed a 98.5% conversion based on weight (9.4 grams) of isolated acetylide.

EXAMPLE V

Example IV was repeated with the same amounts of reactants but with a very short reaction time. The temperature was 5–30° C., pressure 610–745 p.s.i.g. and the reaction time one-half hour. The yield was 8.3 grams (86.5% of theory) and the purity based on acetylide was 73%.

EXAMPLE VI 12 cc. of the 40% dispersion of sodium in Nujol, 0.20 mole sodium, was reacted with 30.4 cc., 0.8 mole liquid ammonia, in the absence of liquid acetylene, to determine if sodamide is formed as a reaction intermediate. The temperature was 22–24° C., pressure 80–82 p.s.i.g. and the reaction time was two hours. There was no conversion to sodamide.

EXAMPLE VII

The procedure of Example I was followed using 0.10 mole sodium and 0.45 mole acetylene but without ammonia added. The reaction temperature was 21–26° C., pressure 520–560 p.s.i.g. and the reaction time was 5½ hours. The yield of sodium acetylide was 3.6 grams (74.8% of theory) and its purity based on acetylide was 62%.

EXAMPLE VIII

The procedure of Example I was followed using the same amounts of sodium and acetylene but using 0.05 mole trimethylamine instead of 0.05 mole ammonia. The temperature was −8 to 31° C., pressure 400 to 712 p.s.i.g. and the reaction time was 1½ hours. The sodium acetylide yield was 3.2 grams (67% of theory) and the purity was 79% based on acetylide.

EXAMPLE IX

The procedure of Example I was followed using 0.10 mole potassium instead of sodium, 0.60 mole acetylene and 0.20 mole ammonia. The reaction temperature was 26–30° C., pressure 349–380 p.s.i.g. and the reaction time was 3 hours. The yield was 5.8 grams potassium acetylide (90.5% of theory). However, there was some loss (undetermined) of potassium sand on transfer and decantation. Accordingly, this yield is a minimum figure.

EXAMPLE X

The procedure of Example I was followed using 0.34 mole lithium instead of sodium, 1.00 mole acetylene and 0.20 mole ammonia. The reaction temperature was 18–32° C., pressure 475–598 p.s.i.g. and the reaction time was 3 hours. The yield of lithium acetylide was 10.5 grams (95.5% of theory). The lithium acetylide was not stable. It dissociated to the carbide ($Li_2C_2$) on standing a total of seven days and lost weight gradually from 10.5 grams to 6.1 grams.

The above data shows that alkali metals can be reacted with liquefied acetylene, advantageously in the presence of a catalyst such as ammonia and simple alkyl amines to give high yields of the alkali metal acetylides. It will be understood, however, that this invention is not limited to these examples since numerous variations will be apparent to those skilled in this art without departing from the scope of the following claims.

We claim:

1. The process of preparing alkali metal acetylides which comprises reacting on alkali metal with an excess of liquid acetylene.

2. The process of preparing alkali metal acetylides which comprises reacting on alkali metal with an excess of liquid acetylene and in contact with a catalyst selected from the group consisting of liquid ammonia and alkyl amines.

3. The process as defined in claim 2, in which the catalyst is liquid ammonia.

4. The process as defined in claim 3, in which the alkali metal is sodium and the amount of ammonia is in the range of from 0.05 to 10 moles per gram atom of sodium.

5. The process as defined in claim 2, in which the alkali metal is sodium.

6. The process as defined in claim 2, in which the catalyst is a methyl amine.

7. The process as defined in claim 2, in which the reaction temperature is in the range of from about −30 to 35° C., and the pressure is in the range of about 100 to about 800 p.s.i.g.

8. The process as defined in claim 7, in which the alkali metal is sodium and the catalyst is liquid ammonia.

References Cited

FOREIGN PATENTS 853,111    11/1960    Great Britain.

TOBIAS E. LEVOW, *Primary Examiner.*

A. P. DEMERS, *Assistant Examiner.*

U.S. Cl. X.R.

23—208

PO-1050
(5/69)

UNITED STATES PATENT OFFICE
CERTIFICATE OF CORRECTION

Patent No. 3,441,621      Dated April 29, 1969

Inventor(s) ROBERT J. TEDESCHI and GEORGE L. MOORE

It is certified that error appears in the above-identified patent and that said Letters Patent are hereby corrected as shown below:

Column 2, line 44, "$(Na^+NH_3\cdot)$" should read -- $(Na^+NH_3^-)$ --.
Column 4, line 57, after "temperature" should read -- was --.
Column 6, line 11, "on" should read -- an --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents